US010756521B2

(12) United States Patent
Martinson (10) Patent No.: US 10,756,521 B2
(45) Date of Patent: Aug. 25, 2020

(54) CORD SLEEVE DEVICE AND INSTALLATION TOOL AND METHOD FOR USE

(71) Applicant: NITE IZE, INC., Boulder, CO (US)

(72) Inventor: Daniel J. Martinson, Medina, MN (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 15/710,642

(22) Filed: Sep. 20, 2017

(65) Prior Publication Data
US 2018/0083431 A1  Mar. 22, 2018

Related U.S. Application Data

(60) Provisional application No. 62/396,921, filed on Sep. 20, 2016.

(51) Int. Cl.
| | |
|---|---|
| *H02G 3/04* | (2006.01) |
| *H01R 43/20* | (2006.01) |
| *H02G 1/08* | (2006.01) |
| *H01R 43/00* | (2006.01) |

(52) U.S. Cl.
CPC ......... *H02G 3/0462* (2013.01); *H01R 43/002* (2013.01); *H01R 43/20* (2013.01); *H02G 1/08* (2013.01); *H01R 2201/00* (2013.01)

(58) Field of Classification Search
CPC ... H01R 43/20; H01R 2201/00; H02G 3/0462
USPC .......................................... 174/74 R; 29/235
See application file for complete search history.

(56) References Cited

U.S. PATENT DOCUMENTS

| | | | | | |
|---|---|---|---|---|---|
| 4,112,251 | A | * | 9/1978 | Scott ........................ | H01R 4/22 174/87 |
| 4,303,799 | A | * | 12/1981 | Ishihara ................. | H01B 17/40 174/176 |
| 4,365,947 | A | * | 12/1982 | Bahder .................. | H02G 1/145 156/47 |
| 4,572,179 | A | * | 2/1986 | Teitelbaum ............ | A61B 17/12 29/235 |
| 4,719,315 | A | * | 1/1988 | Gregorac ................. | H01R 9/05 174/73.1 |

(Continued)

OTHER PUBLICATIONS

International Search Report and Written Opinion dated Jan. 17, 2018 issued in related PCT App. No. PCT/US2017/052549 (17 pages).

*Primary Examiner* — Dimary S Lopez Cruz
(74) *Attorney, Agent, or Firm* — Haynes and Boone, LLP (57) ABSTRACT

A system for installing a cord sleeve includes a first lever arm, the first lever arm including a first protrusion approximately perpendicular to the first lever arm. The system further includes a second lever arm, the second lever arm including a second protrusion approximately perpendicular to the second lever arm. The first and second lever arm intersect at a pivot point and are pivotally attached to each other at the pivot point, such that the first protrusion and the second protrusion are parallel and adjustment to each other, the first lever arm and the second lever arm having a first position where the first protrusion and the second protrusion are together and a second position where the first protrusion and the second protrusion are separated. The system further includes the first lever arm includes a ball portion at the pivot point.

18 Claims, 12 Drawing Sheets

(56) References Cited

U.S. PATENT DOCUMENTS

| | | | | |
|---|---|---|---|---|
| 4,771,518 A * | 9/1988 | LaPointe | ............ | A61F 13/04 |
| | | | | 138/123 |
| 5,014,407 A * | 5/1991 | Boughten | ............ | B25B 7/02 |
| | | | | 29/235 |
| 5,683,767 A * | 11/1997 | Shiraki | ............ | B29C 47/0004 |
| | | | | 138/DIG. 7 |
| 5,710,851 A * | 1/1998 | Walter | ............ | G02B 6/3887 |
| | | | | 385/100 |
| 6,100,472 A * | 8/2000 | Foss | ............ | G02B 6/4428 |
| | | | | 174/77 R |
| 7,335,836 B2 * | 2/2008 | Arakawa | ............ | F21S 8/06 |
| | | | | 174/36 |
| 7,914,347 B2 * | 3/2011 | Paulus | ............ | H01R 24/50 |
| | | | | 439/680 |
| 7,923,636 B2 * | 4/2011 | Prasad | ............ | H02G 15/007 |
| | | | | 174/135 |
| 8,245,734 B2 * | 8/2012 | Jahani | ............ | B21C 25/08 |
| | | | | 138/109 |
| 8,439,614 B2 * | 5/2013 | Bland | ............ | F16B 13/063 |
| | | | | 411/45 |
| 8,708,727 B2 * | 4/2014 | Spahi | ............ | H01R 13/523 |
| | | | | 174/152 GM |
| 8,889,989 B2 * | 11/2014 | Maher | ............ | H02G 15/064 |
| | | | | 138/109 |
| 2011/0144624 A1 | 6/2011 | Glaister | | |
| 2012/0035638 A1 * | 2/2012 | Mathaneswaran | ....... | A61B 1/32 |
| | | | | 606/170 |
| 2013/0326854 A1 | 12/2013 | Kady et al. | | |

* cited by examiner

CORD SLEEVE DEVICE AND INSTALLATION TOOL AND METHOD FOR USE

CROSS REFERENCE TO RELATED APPLICATION

This application claims the benefit of U.S. Provisional Patent Application No. 62/396,921 filed Sep. 20, 2016, and is incorporated by reference to the same extent as though fully contained herein.

FIELD OF USE

Embodiments relate to an elastomeric sleeve and a tool for placement of the sleeve onto a cable end.

BACKGROUND

Standard cables as are now commonly used for the charging of various personal electronics, such as phones and tablets, typically include a Universal Serial Bus (USB) sized end and device end specific to the personal electronic used. Often, these cables are used frequently as the demands for powering and charging the device are ever increasing. Typically, the ends of these cables become stressed over time and fray or break as the connection between cable and the cable end as the cable is bent, moved, and positioned relative to the cable end.

Often to combat this problem, individuals will utilize self-remedies such as tape, glue, or other adhesives. Although these solutions may help with the problem, they are temporary solutions and are not capable of preventing the damage in the first place. Therefore, there is a need in the marketplace for a device that both represents a solution to commonly frayed cables and prevents the fraying before it occurs. Further, it would be advantageous if this device could have a dual purpose and be used as an identification element to aid in the proper identification of a cable owner. Still further, it would be advantageous if this device and identification method were provided as a kit with both a device and a tool for the installation of the device. Preferably, this tool is provided in a package friendly configuration and easily assembled.

SUMMARY

A new and improved cable protection and identification device and tool for installation are disclosed. The device is a generally tubular and elastomeric body having open ends and designed for placement on a cord end. The tubular body of the device is generally provided with a tapered thickness or comprised of separate tiers of thicknesses wherein the elastomeric body is generally able conform to wider and smaller dimensioned surfaces in combination. The device functions as an elastic and flexible sleeve to prevent significant bending of the cable at the cable ends.

The tool of the device is provided in a pair of separate members that are removably joined to form a spreading tool for placement of the elastomeric device onto the cable end. In use, the tool is assembled and the tubular device is placed upon the tapered arms of the spreader tool. The spreader tool arms are then separated enlarging the ends of the tubular body of the device, wherein the device is placed over the cable end and positioned at the desired location. The device is then removed from the spreader tool by slipping the device off of the tapered arms. The device elastomeric properties then restrict some of the movement of the cable, particularly movement to a direct bend at approximately 90 degrees or less than degrees relative to the cable end. In particular, the device is sized for placement over an USB-sized cable end.

Embodiments of the device can additionally be provided in alternate colors. The alternate colors allow for easy identification of cables the device is placed upon.

In one embodiment, a system for installing a cord sleeve includes a first lever arm, the first lever arm including a first protrusion approximately perpendicular to the first lever arm. The system further includes a second lever arm, the second lever arm including a second protrusion approximately perpendicular to the second lever arm. The first and second lever arm intersect at a pivot point and are pivotally attached to each other at the pivot point, such that the first protrusion and the second protrusion are parallel and adjustment to each other, the first lever arm and the second lever arm having a first position where the first protrusion and the second protrusion are together and a second position where the first protrusion and the second protrusion are separated. The system further includes the first lever arm includes a ball portion at the pivot point. In one alternative, the second lever arm includes a socket portion at the pivot point. In another alternative, the ball portion is removably connected to the socket portion and provides for the pivot point. Alternatively, the first protrusion and the second protrusion are tapered spreader ends having a more narrow profile distal from the first and second lever arm respectively.

In one embodiment, a system for installing a cord sleeve includes a first lever arm, the first lever arm including a first arm extending away from the first lever arm at a first angle. The system further includes a second lever arm, the second lever arm including a second arm extending away from the second lever arm at a second angle. The first and second lever arm intersect at a pivot point and are pivotally attached to each other at the pivot point, such that the first protrusion and the second protrusion are parallel and adjustment to each other, the first lever arm and the second lever arm having a first position where the first arm and the second arm are together and a second position where the first arm and the second arm are separated. In one alternative, the first lever arm includes a ball portion at the pivot point. In another alternative, second lever arm includes a socket portion at the pivot point. Alternatively, the ball portion is removably connected to the socket portion and provides for the pivot point. Optionally, the first arm and the second arm are tapered having a more narrow profile distal from the first and second lever arm respectively. Alternatively, the first angle and the second angle are approximately 90 degrees.

In one embodiment, a cable end protector includes a tubular sleeve, the tubular sleeve having a tapered profile, such that a first end of the tubular sleeve has a first diameter and a second end of the tubular sleeve has a second diameter, and the tubular sleeve is composed of a material having elasticity. Alternatively, the tubular sleeve has a ledge portion, the ledge portion characterized by an area having a distinct and rapid transition from a first diameter to a second diameter, the ledge portion for indicating a transition point from a cable end to a cable.

In one embodiment, a cable sleeve system includes a tubular sleeve, the tubular sleeve having a tapered profile, such that a first end of the tubular sleeve has a first diameter and a second end of the tubular sleeve has a second diameter, and the tubular sleeve is composed of a material having elasticity. The system further includes, a first lever arm, the first lever arm including a first arm extending away from the first lever arm at a first angle. The system further includes a second lever arm, the second lever arm including a second arm extending away from the second lever arm at a second angle. The first and second lever arm intersect at a pivot point and are pivotally attached to each other at the pivot point, such that the first protrusion and the second protrusion are parallel and adjustment to each other, the first lever arm and the second lever arm having a first position where the first arm and the second arm are together and a second position where the first arm and the second arm are separated. The elasticity of the material is such that the tubular sleeve may be stretched over the first and second lever arm when the first and second lever arm are in the first position. In one alternative, the first lever arm includes a ball portion at the pivot point. In another alternative, the second lever arm includes a socket portion at the pivot point. Alternatively, the ball portion is removably connected to the socket portion and provides for the pivot point. Optionally, the first arm and the second arm are tapered having a more narrow profile distal from the first and second lever arm respectively. In another alternative, the first angle and the second angle are approximately 90 degrees. Optionally, the tubular sleeve has a ledge portion, the ledge portion characterized by an area having a distinct and rapid transition from a first diameter to a second diameter, the ledge portion for indicating a transition point from a cable end to a cable.

In one embodiment, a method for installing a cable sleeve includes providing:

a tubular sleeve, the tubular sleeve having a tapered profile, such that a first end of the tubular sleeve has a first diameter and a second end of the tubular sleeve has a second diameter, and the tubular sleeve is composed of a material having elasticity;

a first lever arm, the first lever arm including a first arm extending away from the first lever arm at a first angle. The method further includes providing a second lever arm, the second lever arm including a second arm extending away from the second lever arm at a second angle. The first and second lever arm intersect at a pivot point and are pivotally attached to each other at the pivot point, such that the first protrusion and the second protrusion are parallel and adjustment to each other, the first lever arm and the second lever arm having a first position where the first arm and the second arm are together and a second position where the first arm and the second arm are separated. The elasticity of the material is such that the tubular sleeve may be stretched over the first and second lever arm when the first and second lever arm are in the first position. The method further includes placing the tubular sleeve on the first and second arm with the first and second lever arm in the first position. The method further includes stretching the tubular sleeve by manipulating the first and second lever arm. The method further includes placing a cord through the tubular sleeve. The method further includes releasing the tubular sleeve from the first and second arm.

BRIEF DESCRIPTION OF THE DRAWINGS

The accompanying drawings are included to provide a further understanding of embodiments of the cord sleeve and the tool for installation of the cord sleeve and are incorporated in and constitute a part of this specification. The drawings illustrate exemplary embodiments and together with the description serve to further explain the principles of the cord sleeve and the tool for installation of the cord sleeve. Other aspects of the cord sleeve and the tool for installation of the cord sleeve and the advantages of the cord sleeve and the tool for installation of the cord sleeve will be better appreciated as they become better understood by reference to the Detailed Description when considered in conjunction with accompanying drawings, and wherein.

DETAILED DESCRIPTION

The following detailed description includes references to the accompanying drawings, which form a part of the detailed description. The drawings show, by way of illustration, specific embodiments in which the cord sleeve and device for installing it, as well as associated methods, may be practiced. These embodiments, which are also referred to herein as "examples," are described in enough detail to enable those skilled in the art to practice the cord sleeve and device for installing it, as well as associated methods. The embodiments may be combined, other embodiments may be utilized, or structural, and logical changes may be made without departing from the scope of this disclosure. The following detailed description is, therefore, not to be taken in a limiting sense.

Before the cord sleeve and device for installing it, as well as associated method is described in such detail, however, it is to be understood that the embodiments described herein are not limited to particular variations set forth and may, of course, vary. Various changes may be made to the embodiments described and equivalents may be substituted without departing from the true spirit and scope of this disclosure. In addition, many modifications may be made to adapt a particular situation, material, composition of matter, process, process act(s) or step(s), to the objective(s), spirit or scope of this disclosure. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the disclosure or claims.

As used herein, the terms "preferred" and "preferably" refer to embodiments that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of this disclosure.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring to FIG. 1-12, various views of a device and installation tool for protecting cable ends and cables, particularly at the joint between the cable and the cable end. The device (or cord sleeve) is generally referred to as device 10 and is comprised of an elastomeric material have sufficient elasticity and sized to stretch over an USB-styled cable end. The device 10 is provided in a tubular structure 100 having a tapered profile from a first end 101 to a second end 102, wherein the first end 101 is generally thicker in profile when compared to the second end 102. Each of the ends 101, 102 includes an aperture 110, 120 with the apertures in communication with an interior of the tubular structure 100 of the device 10. The device 10 tapered profile can include a distinct ledge portion, the ledge portion representing a transition from a wider thickness to a narrow thickness. The ledge aiding in indicating a point of transition between the cable end and cable. The ledge prevents kinks in the cable at the taper point by providing a natural bending point. In use, the device 10 is placed over cables and cable ends to protect a cable from damage or fraying, by stiffing the cable and cable end transition. The device 10, additionally, can be comprised of a multitude of colors, wherein the device 10 can be installed and utilized as a cable identification means.

The device 10 is installed onto the cable and over the cable end through a tool device 20. The tool device 20 is anticipated to be provided in combination with the device 10, wherein the packaging of the device includes the tool 20 allowing the user to easily install the device 10 onto the cable and cable ends. The tool 20 is comprised of a pair of halves 201 and 202 with the halves in hinged communication. The tool 20 is generally designed to engage the device 10 tubular interior through the apertures 110, 120 and spread or widen the apertures 110, 120 through stretching to place the device 10 over the cable end. The elastomeric properties of the device 10 allow it to be stretched and recover to its original dimensions. Generally, device 10 may be made of a material that may stretch and therefore be opened sufficiently to allow a cord end to pass through and thereafter cinch around the cord end.

The tool halves 201, 202 each have a handle end 210, 220 and spreader end 211, 221. The tool halves 201, 202 may also be referred to as lever arms herein. The spreader end 211, 221 is positioned perpendicular to the axis of the tool 20 and tapered from a narrow end to wide end. The narrow end of device 10 optimally is placed such that it is placed on the spreader ends 211, 221 last. The spreader end may also be referred to as protrusions or arms herein. The narrow end opposed the wide end and opposite the main axis of the tool 20. This tapered shape allowing the device 10 to be placed onto the spreader ends 211, 221 and slipped over the ends and onto the tool 20. The tapered shape also provides for the device to be used in the removal of the device, since the tapered ends may be more easily inserted between the cord and the device 10.

The tool halves 201, 202 are coupled together in hinged communication, wherein the tool 20 is manipulated from a closed to an open position. Preferably this hinged communication is a modified ball and socket configuration, wherein the first tool half 201 includes the cylindrical ball portion 212 and the second tool half 202 includes the socket portion 222. The receipt of the ball portion 212 within the socket portion 222 forms a robust and hinged joint that allows the tool to operate as a spreader for the device 10. Alternatively, various other hinge or pivot mechanisms may be used. For instance, one arm may have a pin type protrusion and the other arm may have an aperture or socket for receiving the pin. In such a configuration, one of the spreader ends 211 may be longer than the other spreader end 221 to compensate for one arm sitting on top of the other arm.

Figure 1:
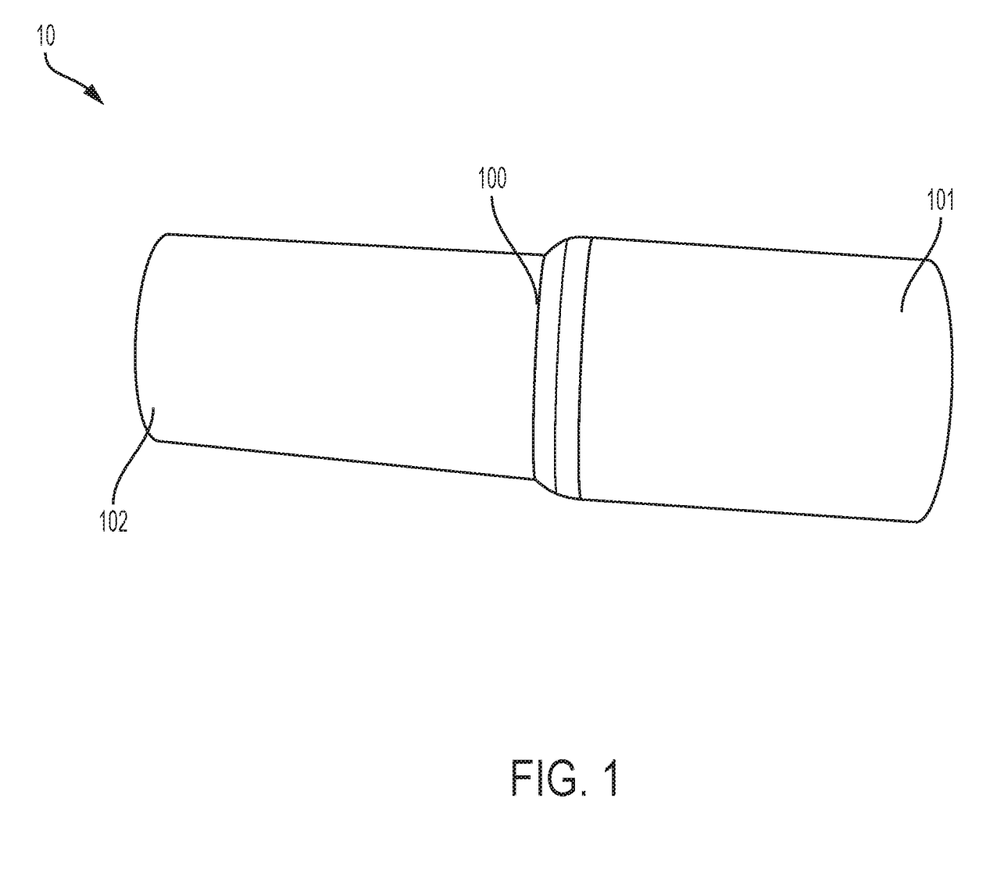
FIG. 1 is a side view of one embodiment of a cord sleeve.
Figure 2:
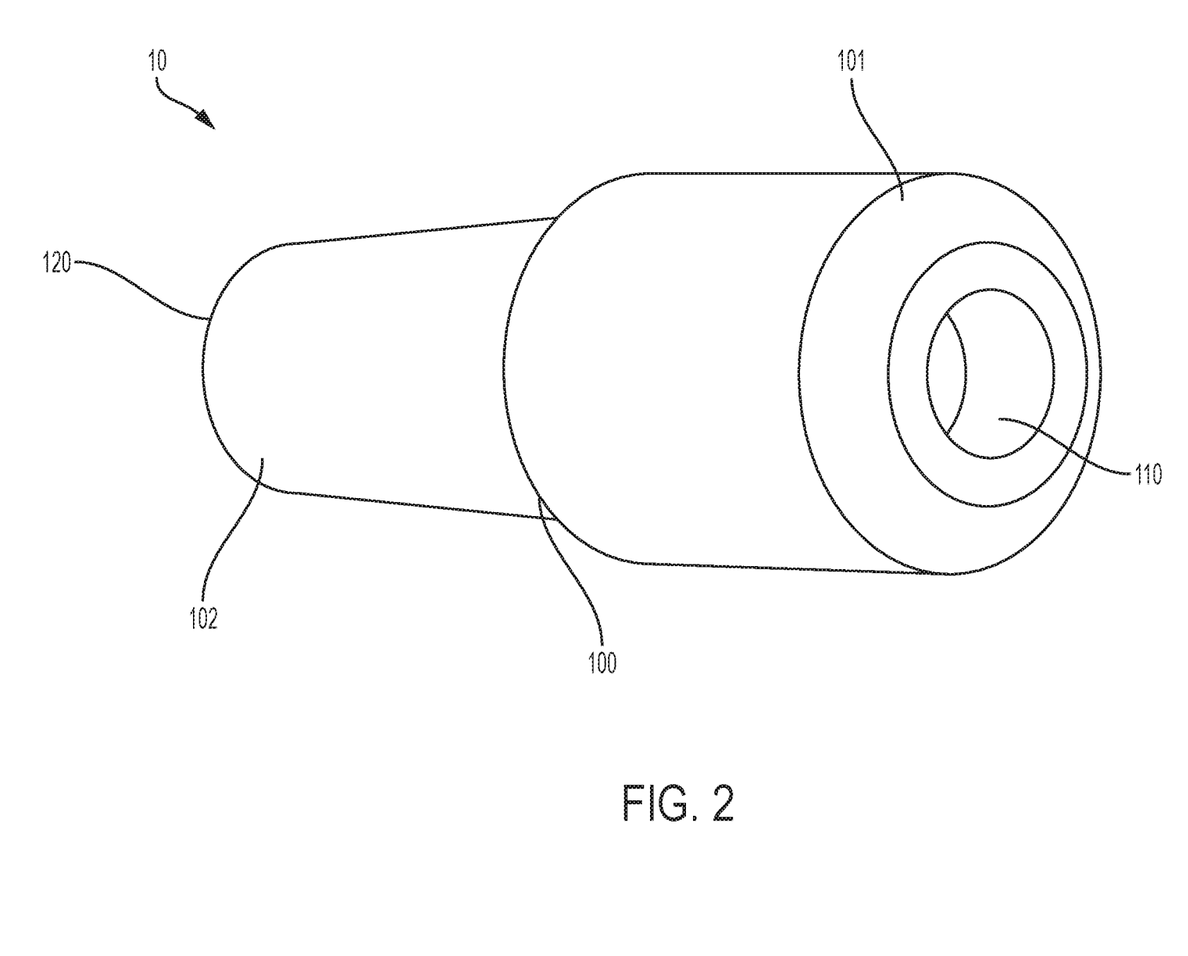
FIG. 2 is an isometric view of the cord sleeve of FIG. 1.
Figure 3:
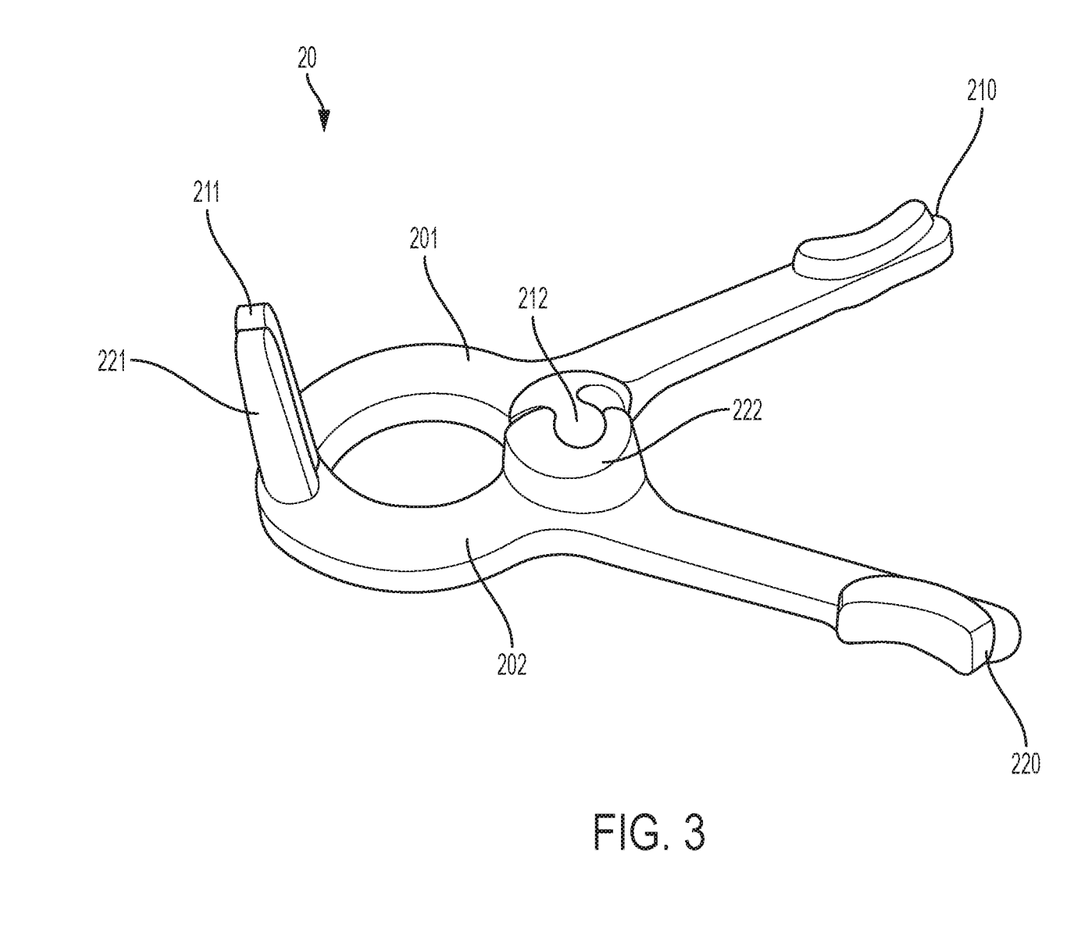
FIG. 3 is an isometric view of one embodiment of a tool device in a closed position.
Figure 4:
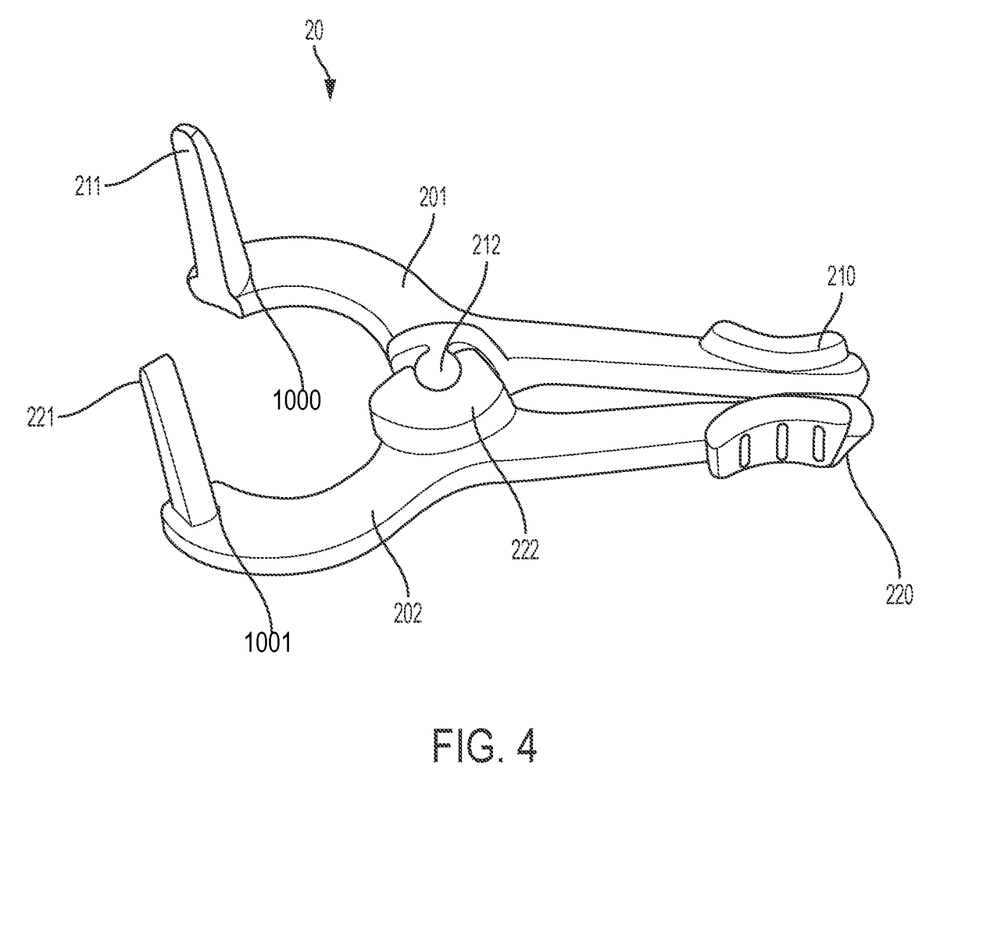
FIG. 4 is an isometric view of the tool device of FIG. 3 in an open position.
Figure 5:
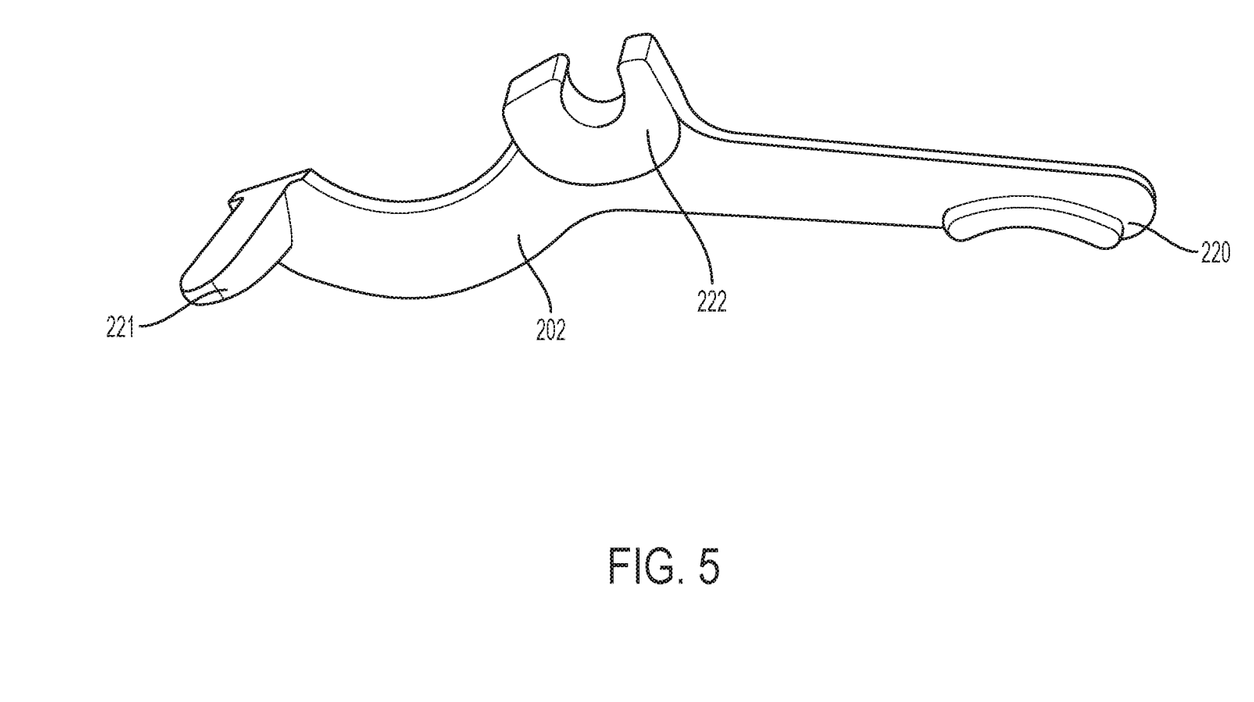
FIG. 5 is a top view of a first portion of the tool device of FIG. 3.
Figure 6:
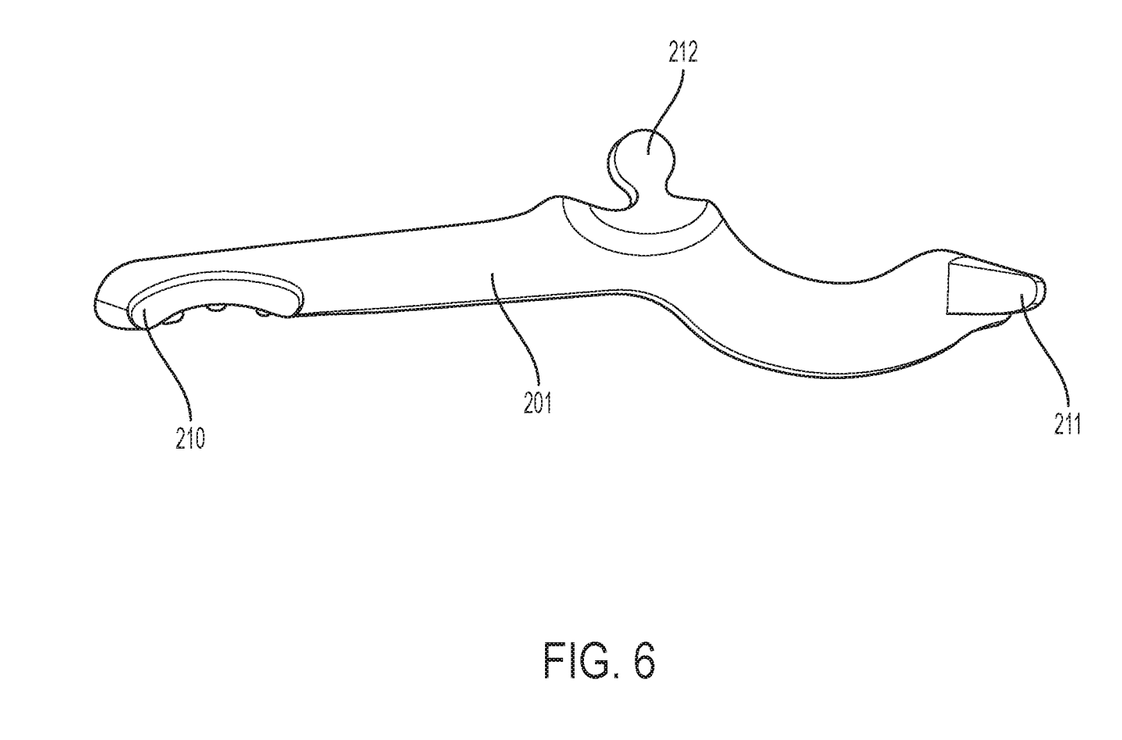
FIG. 6 is a top view of a second portion of the tool device of FIG. 3.
Figure 7:
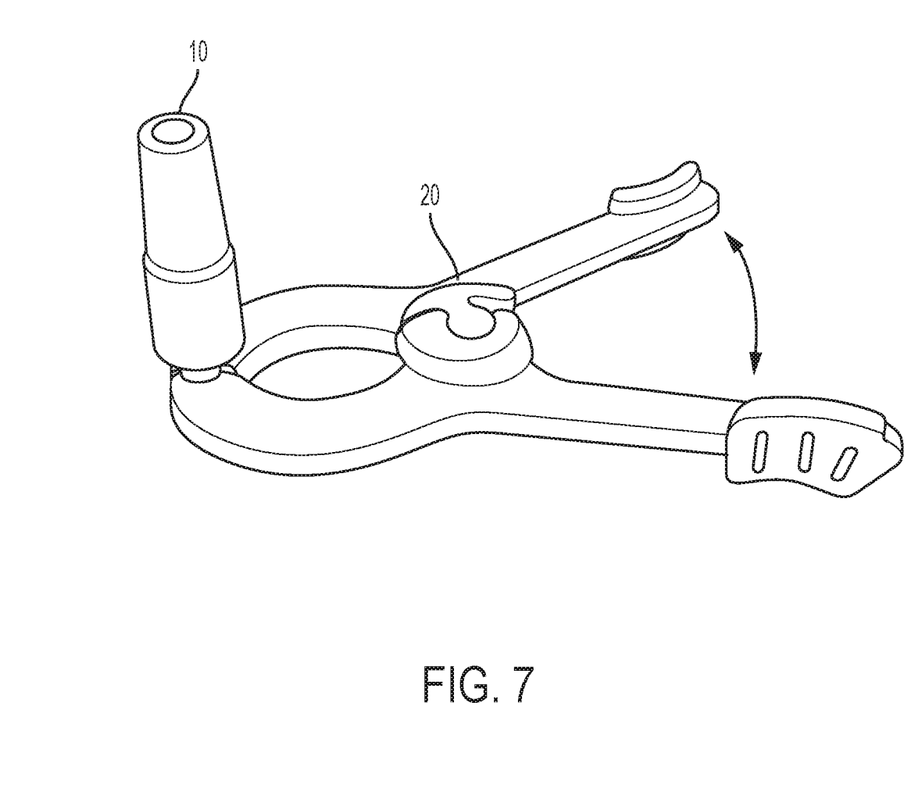
FIG. 7 is an isometric view of the cord sleeve of FIG. 1 partially installed on the tool device of FIG. 3.

Preferably, the tool 20 is provided with the halves 201, 202 separated within the packaging and assembled by the user. Accordingly, the ball portion 212 is slid into the socket portion 222 to form the complete tool 20 and allow for installation of the device 10.

Figure 8:
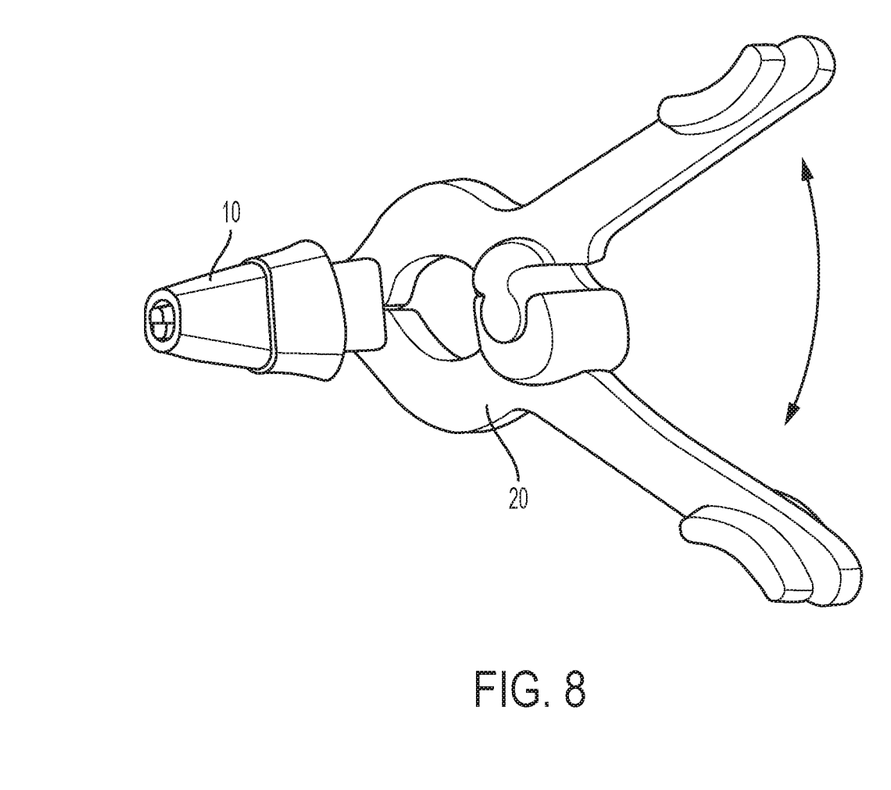
FIG. 8 is an isometric view of the cord sleeve of FIG. 1 fully installed on the tool device of FIG. 3.
Figure 9:
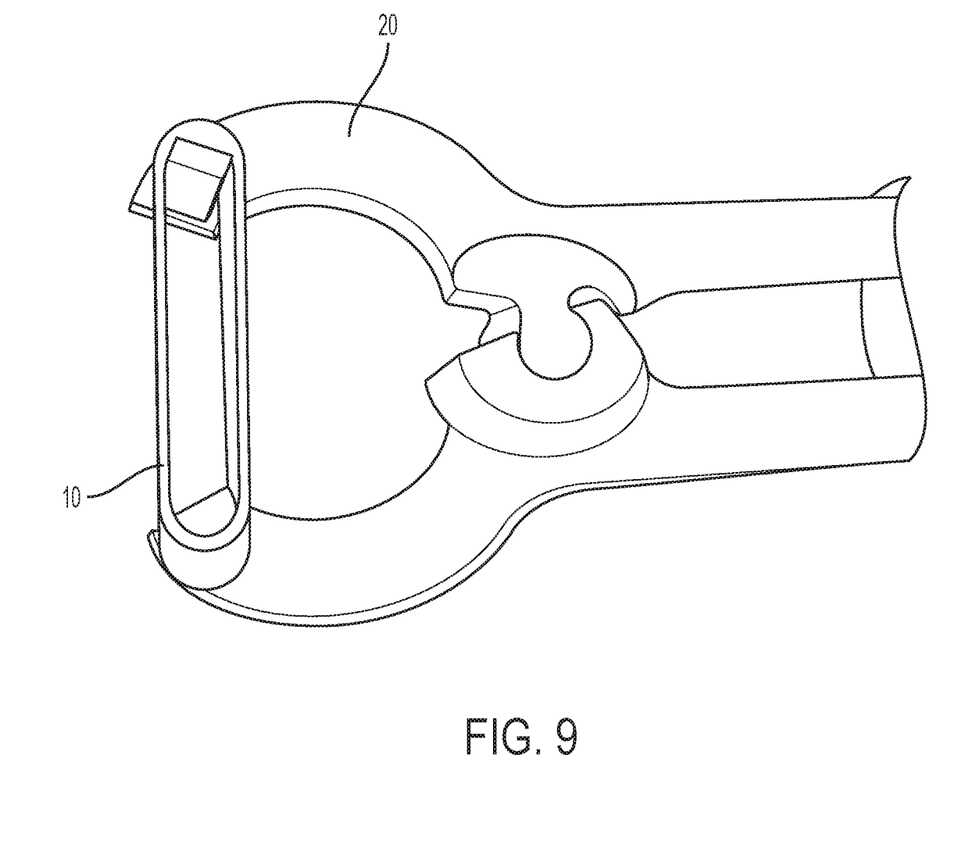
FIG. 9 is an isometric view of the cord sleeve of FIG. 1 fully installed on the tool device of FIG. 3 in an open position.
Figure 10:
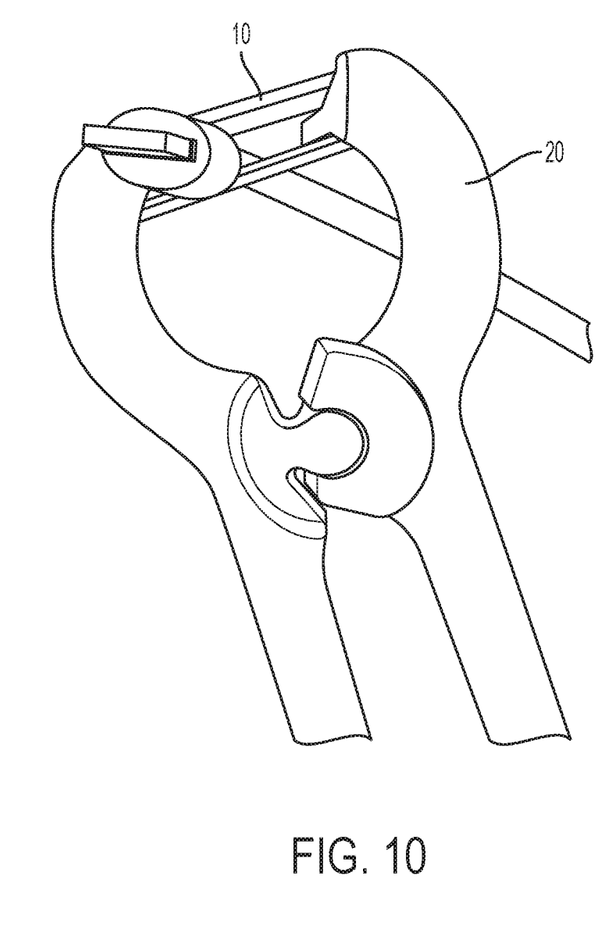
FIG. 10 is an isometric view of the cord sleeve of FIG. 1 fully installed on the tool device of FIG. 3 in an open position with a cable end inserted.
Figure 11:
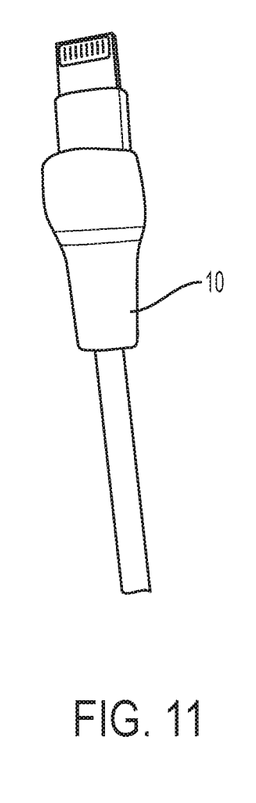
FIG. 11 is an isometric view of the cord sleeve of FIG. 1 fully installed on a cable end.
Figure 12:
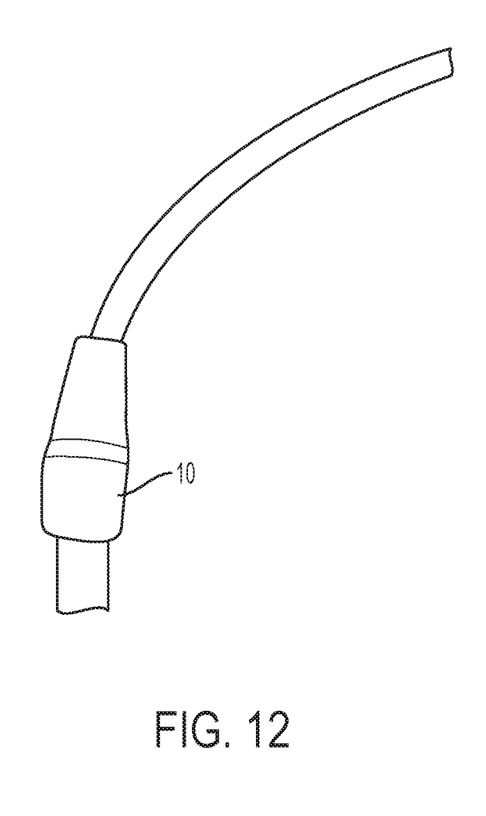
FIG. 12 is an isometric view of the cord sleeve of FIG. 1 fully installed on a cable end with the cable end under strain.

In use, the device 10 is placed on the spreader ends 211, 221 of the tool 20 (FIG. 7) where the device 10 is pushed down and onto the spreader ends 211, 221 (FIG. 8). The tool 20 is then manipulated to widen the apertures 110, 120 of the device 10 by moving the handle ends 210, 220 together (FIG. 9). The user can then place the device 10 over the cable end and onto the desired portion of the cable (FIG. 10). The handle ends 210, 220 are then released where the elasticity of the device 10 closes the tool 20. The user will grasp the device 10 and remove the tool 20 from the device 10. The device 10 is then retained on the cable at the desired position (FIGS. 11-12) and wherein the device 10 prevents the cable end from bending at too acute of an angle for the properties of the cable.

While the embodiments of the cord sleeve and device for installing it, as well as associated methods, have been described with reference to an exemplary embodiment(s), it will be understood by those skilled in the art that various changes may be made and equivalents may be substituted for elements thereof without departing from the scope of this disclosure. In addition, many modifications may be made to adapt a particular situation or material to the teachings of this disclosure without departing from the essential scope thereof. Therefore, it is intended that the claims not be limited to the particular embodiment(s) but that the claims will include all embodiments falling with the scope of the appended claims.

What is claimed is:

1. A system for installing a cord sleeve, the system comprising:
    a first lever arm, the first lever arm including a first protrusion approximately perpendicular to the first lever arm and a first hinge portion defined at least partially by a first curved surface; and
    a second lever arm, the second lever arm including a second protrusion approximately perpendicular to the second lever arm and a second hinge portion,
    wherein the first and second lever arms are pivotally coupled to each other at a hinge, the hinge defined by receipt of the first hinge portion of the first lever arm at least partially within the second hinge portion of the second lever arm, the second hinge portion slidably engaging the first curved surface of the first hinge portion, the second hinge portion partially surrounding the first hinge portion to define the hinge, such that the first protrusion and the second protrusion are parallelly adjusted to each other, the first lever arm and the second lever arm having a first position where the first protrusion and the second protrusion are together and a second position where the first protrusion and the second protrusion are separated.

2. The system of claim 1, wherein the first protrusion and the second protrusion are tapered spreader ends having a more narrow profile distal from the first and second lever arm respectively.

3. The system of claim 1, wherein:
    the first hinge portion includes a cylindrical portion, the cylindrical portion defined at least partially by the first curved surface;
    the second hinge portion includes a socket portion complementary to the cylindrical portion the socket portion defined at least partially by a second curved surface;
    the cylindrical portion of the first lever arm is received at least partially within the socket portion of the second lever arm to define the hinge, the second curved surface of the socket portion slidably engaging the first curved surface of the cylindrical portion.

4. A system for installing a cord sleeve, the system comprising:
    a first lever arm, the first lever arm including a first arm extending away from the first lever arm and a cylindrical portion defined at least partially by a first curved surface;
    a second lever arm, the second lever arm including a second arm extending away from the second lever arm and a socket portion defined at least partially by a second curved surface complementary to the first curved surface,
    wherein the first and second lever arms are pivotally coupled to each other at a hinge, the hinge defined by receipt of the cylindrical portion at least partially within the socket portion, the first curved surface in facing engagement with the second curved surface and the socket portion partially surrounding the cylindrical portion to define the hinge, such that the first arm and the second am are parallelly adjusted to each other, the first lever arm and the second lever arm having a first position where the first arm and the second arm are together and a second position where the first arm and the second arm are separated.

5. The system of claim 4, wherein the first arm and the second arm are tapered having a more narrow profile distal from the first and second lever arm respectively.

6. The system of claim 4, wherein the first curved surface defines a convex outer surface of the cylindrical portion, and wherein the second curved surface defines a concave inner surface of the socket portion.

7. A cable end protector comprising:
    a tubular sleeve composed of a material having elasticity and having a tapered profile from a first end to an opposing second end, the tubular sleeve comprising:
        a first sleeve portion tapering from a first diameter at the first end to a second diameter;
        a second sleeve portion tapering from a third diameter to a fourth diameter at the second end; and
        a ledge portion between the first and second sleeve portions, the ledge portion tapering from the second diameter of the first sleeve portion to the third diameter of the second sleeve portion to provide a tapered transition between the first and second sleeve portions, wherein the ledge portion includes a taper different than at least one taper of the first and second sleeve portions.

8. The cable end protector of claim 7, wherein the ledge portion includes a taper different than those of the first and second sleeve portions.

9. The cable end protector of claim 7, wherein the ledge portion tapers from a narrowest portion of the first sleeve portion to the second sleeve portion.

10. The cable end protector of claim 7, wherein the tapered transition is non-linear.

11. A cable sleeve system, the system comprising:
    a tubular sleeve composed of a material having elasticity and having a tapered profile from a first end to an opposing second end, the tubular sleeve comprising:
        a first sleeve portion tapering from a first diameter at the first end to a second diameter;
        a second sleeve portion tapering from a third diameter to fourth diameter at the second end; and
        a ledge portion between the first and second sleeve portions, the ledge portion tapering from the second diameter of the first sleeve portion to the third diameter of the second sleeve portion to provide a tapered transition between the first and second sleeve portions, wherein the ledge portion includes a taper different than at least one taper of the first and second sleeve portions;
    a first lever arm, the first lever arm including a first arm extending away from the first lever arm; and
    a second lever arm, the second lever arm including a second arm extending away from the second lever arm,
    wherein the first and second lever arms are pivotally coupled to each other at a hinge, such that the first arm and the second arm are parallelly adjusted to each other, the first lever arm and the second lever arm having a first position where the first arm and the second arm are together and a second position where the first arm and the second arm are separated, and wherein the elasticity of the material is such that the tubular sleeve may be stretched over the first and second arms when the first and second lever arms are in the first position.

12. The system of claim 11, wherein the first lever arm includes a ball portion at the pivot point.

13. The system of claim 12, wherein the second lever arm includes a socket portion at the pivot point.

14. The system of claim 13, wherein the ball portion is removably connected to the socket portion and provides for the pivot point.

15. The system of claim 14, wherein the first arm and the second arm are tapered having a more narrow profile distal from the first and second lever arm respectively.

16. The cable sleeve system of claim 11, wherein:
the first lever arm comprises a cylindrical portion defined at least partially by a first curved surface;
the second lever arm comprises a socket portion defined at least partially by a second curved surface complementary to the first curved surface; and
the first curved surface is in facing engagement with the second curved surface to define the hinge.

17. A method for installing a cable sleeve, the method comprising:
providing:
a tubular sleeve, the tubular sleeve having a tapered profile, such that a first end of the tubular sleeve has a first diameter and a second end of the tubular sleeve has a second diameter, and the tubular sleeve is composed of a material having elasticity, wherein the tubular sleeve has a ledge portion between first and second sleeve portions on opposing ends of the tubular sleeve, the ledge portion providing a tapered transition between the first and second sleeve portions, wherein the ledge portion includes a taper different than tapers of the first and second sleeve portions;
a first lever arm, the first lever arm including a first arm extending away from the first lever arm and a first hinge portion defined at least partially by a curved surface; and
a second lever arm, the second lever arm including a second arm extending away from the second lever arm and a second hinge portion,
wherein the first and second lever arms are pivotally coupled to each other at a hinge, the hinge defined by slidable engagement of the second hinge portion with the curved surface of the first hinge portion, such that the first arm and the second arm are parallelly adjusted to each other, the first lever arm and the second lever arm having a first position where the first arm and the second arm are together and a second position where the first arm and the second arm are separated, and wherein the elasticity of the material is such that the tubular sleeve may be stretched over the first and second arms when the first and second lever arms are in the first position;
placing the tubular sleeve on the first and second arms with the first and second lever arms in the first position;
stretching the tubular sleeve by manipulating the first and second lever arms;
placing a cord through the tubular sleeve; and
releasing the tubular sleeve from the first and second arms.

18. The method of claim 17, wherein:
the first sleeve portion tapers from the first diameter at the first end to a third diameter;
the second sleeve portion tapers from a fourth diameter to the second diameter at the second end; and
the ledge portion tapers from the third diameter of the first sleeve portion to the fourth diameter of the second sleeve portion.

\* \* \* \* \*